Figure 1:
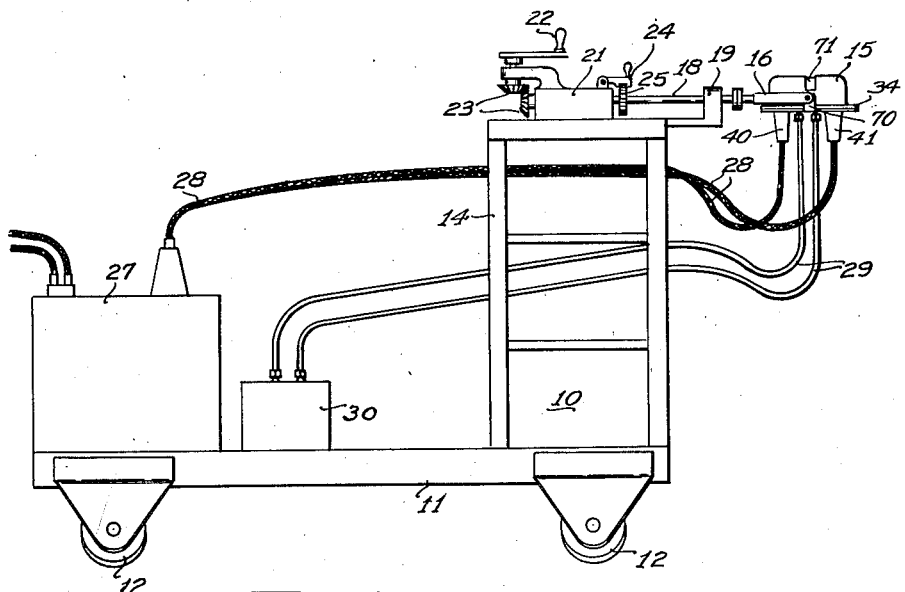

Oct. 10, 1944.   C. E. BOUCHER   2,360,036
INDUSTRIAL RADIOGRAPHIC APPARATUS
Filed Dec. 1, 1942   3 Sheets-Sheet 2

INVENTOR
CORMACK E. BOUCHER
BY *E. A. Buckhorn*
ATTORNEY

Oct. 10, 1944. C. E. BOUCHER 2,360,036
INDUSTRIAL RADIOGRAPHIC APPARATUS
Filed Dec. 1, 1942 3 Sheets-Sheet 3

INVENTOR
CORMACK E. BOUCHER
BY
ATTORNEY

Patented Oct. 10, 1944

2,360,036

UNITED STATES PATENT OFFICE 2,360,036

INDUSTRIAL RADIOGRAPHIC APPARATUS

Cormack E. Boucher, Seattle, Wash.

Application December 1, 1942, Serial No. 468,602

19 Claims. (Cl. 250—90)

The present invention relates to radiographic apparatus and, while it is not necessarily limited thereto, it is adaptable for use in specialized fields of industrial radiography.

Structures, such as penstocks for hydro stations and pipe lines are fabricated in the field by welding cylindrical sections circumferentially together. Such welds cannot readily be radiographed in the field for the determination of the soundness thereof with conventional apparatus.

It is, therefore, an object of the present invention to provide a new and improved portable radiographic apparatus which is particularly suitable for radiographing annular welds in relatively large diameter cylindrical structures.

A further object of the invention is to provide a new and improved portable X-ray apparatus with which circumferential welds in large diameter cylindrical objects may be X-rayed in a short length of time and with a minimum of effort.

A further object of the invention is to provide a new and improved arrangement for supporting a portable X-ray apparatus within a large diameter cylinder for the purpose of X-raying annular welds therein.

It is another object of the invention to provide an improved shock proof X-ray tube housing structure for industrial application.

Another object of the invention is the provision of an X-ray tube housing structure so constructed and arranged as to facilitate the radiographing of sections of annular welds of greater length by a single exposure than has heretofore been possible.

A still further object of the invention is to provide a new and improved housing for an X-ray tube or other source of penetrative rays whereby the radiations are restricted within a relatively limited field extending generally in a plane and radially of the housing.

A still further object of the invention is to provide a new and improved housing for an X-ray tube or other source of penetrative rays whereby a field of radiation is formed of a general fan shape and having a relatively wide angle of divergence and of narrow depth.

A still further object of the invention is to provide a new and improved housing structure for X-ray tubes which comprises relatively few parts of simple design assembled in such a manner as will permit of inspection of the tube in the minimum amount of time.

A still further object of the invention is to provide a new and improved shock-proof housing structure for X-ray tubes and supporting arrangements therefor so constructed that the tube may be readily uncovered for inspection without requiring the removal of the housing from the support or severance of the various tube connections.

In accordance with one form of the invention a portable X-ray apparatus is provided comprising a carriage having a suitable framework at one end for supporting an X-ray tube thereupon in an overhanging relation with respect to the end of the carriage. A high voltage transformer is mounted upon the carriage and connected to the tube for supplying operating potential. Also mounted upon the carriage and suitably connected with the tube is a source of cooling fluid therefor. The carriage is adapted to be placed in the inside of a cylindrical structure to be radiographed and the tube is so mounted upon the supporting framework that it is positioned substantially in the center of the cylinder. A shock-proof housing is provided for the tube having a wall section extending about the housing and around the enclosed tube which is readily permeable to the X radiations so that the field of radiations passed thereby extends radially of the housing and in the direction of the plane of the annular weld in the cylinder which is to be X-rayed. With this apparatus a long strip of film in a suitable holder may be wrapped about the exterior of the cylinder over the weld and exposed all at one time.

Further objects and advantages and various modifications of the invention will be described in the following specification taken in connection with the accompanying drawings, while the features of novelty characterizing the invention will be set forth with greater particularity in the claims appended to and forming a part of the instant disclosure.

Figure 2:
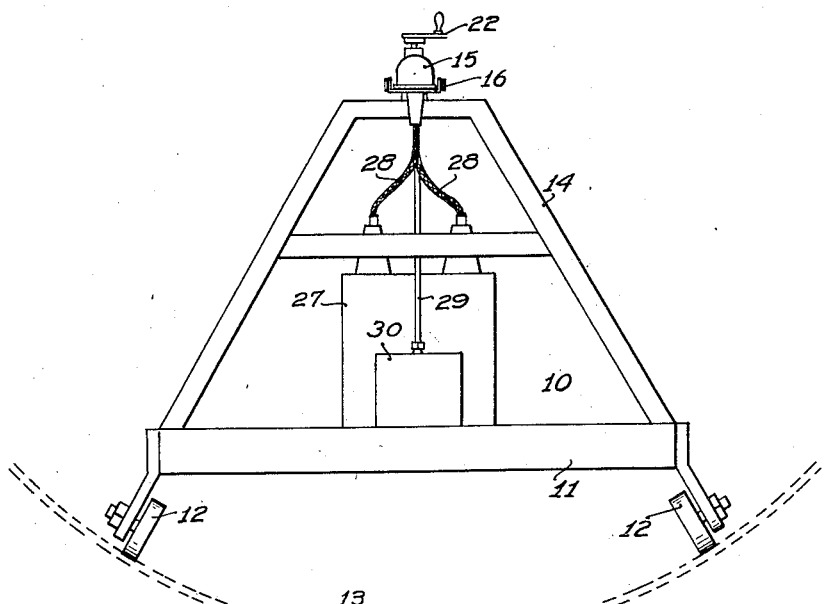
Figure 3:
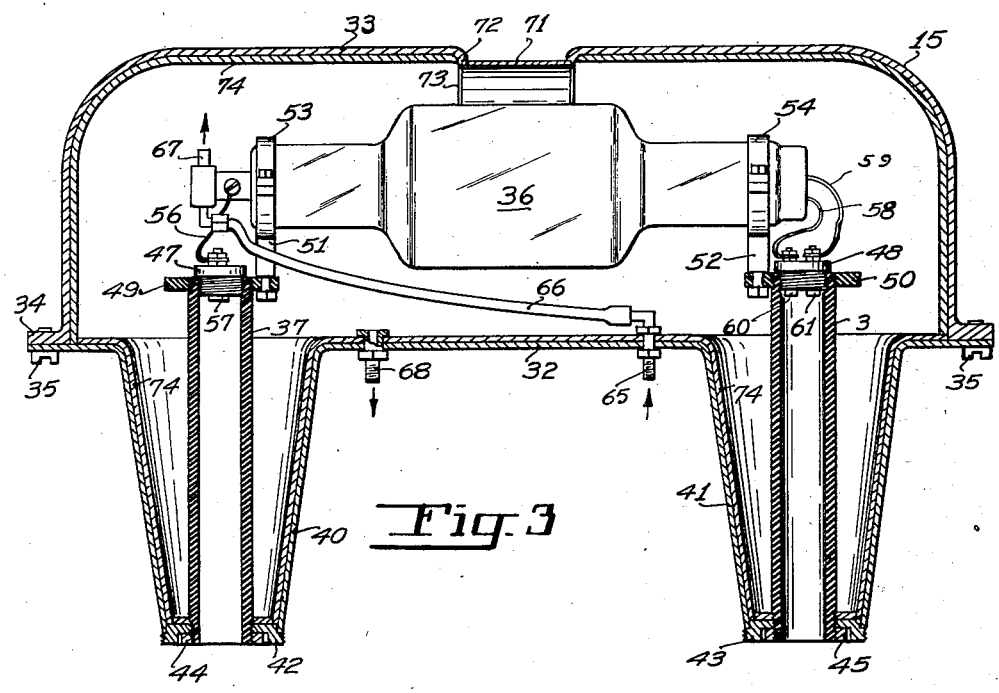
Figure 4:
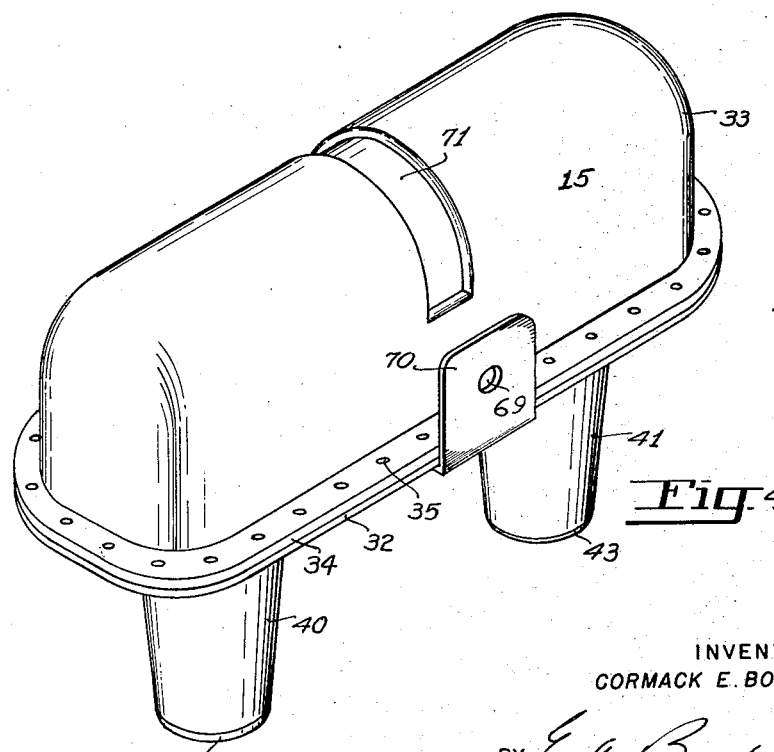
Figure 6:
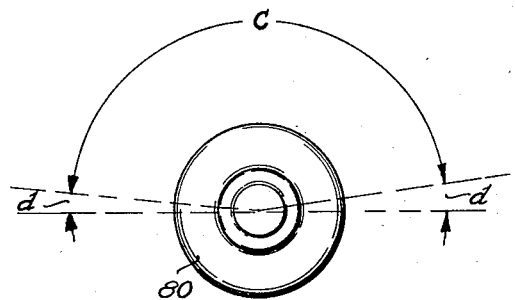
Figure 7:
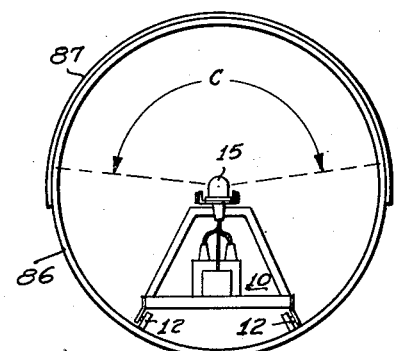
Figure 5:
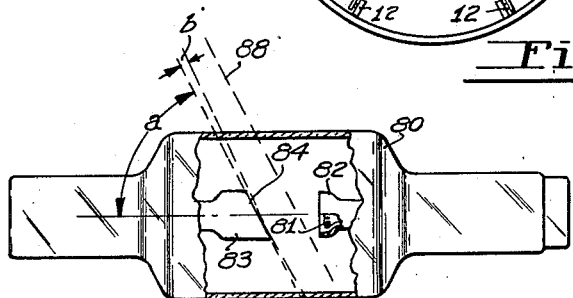
Figure 8:
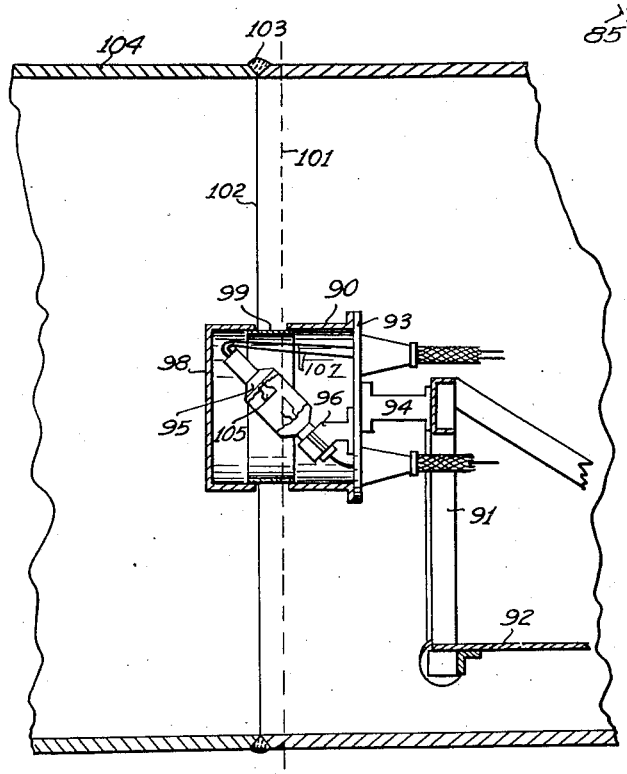

Referring to the drawings, Fig. 1 is a side elevation of an X-ray apparatus constructed in accordance with the present invention; Fig. 2 is an end view of the apparatus shown in Fig. 1; Fig. 3 is an enlarged longitudinal sectional view taken through the X-ray tube housing shown in Fig. 1; Fig. 4 is a view in perspective of the tube housing shown in Fig. 3; Figs. 5, 6 and 7 are diagrammatic views explanatory of certain functional features of the apparatus of the invention; Fig. 8 is a fragmentary view illustrating an X-ray tube housing constructed in accordance with a modification of the invention.

In the following description the radiographic apparatus of the invention will be described with particular reference to one application thereof, namely, that of X-raying annular welds in large diameter cylinders such as pipe lines, penstocks, tanks or the like. It will become obvious, however, as the description proceeds that the invention is not necessarily so limited in its field of applicability since other uses therefor will readily occur to those skilled in the art.

Referring to Figs. 1 and 2, a carriage 10 is shown comprising a platform base 11 provided with wheels 12 at its four corners which are mounted at an angle upon suitable brackets so as to engage squarely with the inner wall of a cylinder indicated by dotted lines 13 in Fig. 2. At one end of the platform 11 is provided an upwardly extending framework 14 and upon the upper end of which is mounted the X-ray tube housing 15 in an overhanging relation with respect to the carriage. The housing 15 is attached to a yoke 16 and which, in turn, is secured upon the end of a shaft 18 supported upon a forwardly extending bracket arm 19 and bearing member 21 rigidly secured to the upper portion of the framework 14. The shaft 18 is adapted to be rotated by means of a hand lever 22 connected therewith as by gearing 23. The shaft 18 may be locked in any predetermined angular relation such as by means of a dog 24 adapted to cooperatively engage with a toothed wheel 25 secured to shaft 18. Mounted upon the platform 11 is a suitable high voltage transformer 27 having its high voltage terminals connected to the tube within housing 15 by leads 28. Also mounted on the platform 11 are suitable means indicated at 30 for supplying cooling fluid to the X-ray tube through flexible conduits 29.

Referring now particularly to Figs. 3 and 4, the details of the X-ray tube housing arrangement 15 will be more fully described. The housing comprises a flat base member 32 of a generally elongate shape and a recessed cover or shell 33, having a flange 34 around the edge thereof which is adapted to be secured in a fluid tight relation by screws 35 to the edge of the base member 32. An X-ray tube 36, which may be of a conventional form, is mounted upon the base member by means of insulating tubes 37 and 38 which also support the terminal structures for the tube electrodes. The base member 32 is provided with a pair of outwardly projecting conical extensions 40 and 41 and within the outer ends of which are mounted the ends of the tubes 37 and 38. As shown clearly in the sectional view of Fig. 3, flanged rings 42 and 43 are secured as by welding to the ends of the cones 40 and 41, respectively, and which rings are internally threaded for cooperatively receiving the threaded ends of the tubes 37—38. Lock nuts 44 and 45, which may be tightened with a spanner wrench, are provided upon the outer ends of the insulating tubes for fixedly securing them in position. Threadedly secured in the ends of the tubes projecting into the interior of the housing are terminal mounting plugs 47 and 48 also of insulating material. Collars 49 and 50 of insulating material are arranged around the outside of the terminal ends of the tubes 37 and 38 and to which are secured the insulating posts 51 and 52 supporting the opposite ends of the tube 36 by means of insulating clamps 53, 54.

Electrical connection to the anode terminal of the tube, shown at the left in Fig. 3 is effected by means of a conductive lead 56 connected to the terminal post of a female connector 57 mounted in the plug 47. The cathode connections may be effected through conductive leads 58, 59 secured to the terminal posts of female connectors 60 and 61, respectively, mounted in the insulating plug 48. The ends of the cables 28 extending from the high voltage X-ray transformer may be provided with suitable plug adapters (not shown) for insertion through the outer ends of the insulating tubes 37 and 38 and into the jacks 57 and 60, 61. For securing the adapters relative to the housing the periphery of the rings 42 and 43 are threaded for cooperatively receiving a suitable flanged clamping ring arranged about the adapter. Such plug type adapters are well known in the art and need not be described. The conical extensions 40 and 41 and the insulating tubes 37 and 38 are of such a length as to provide a long creepage path between the conductive terminals and the housing.

The terminal mounting plugs 47 and 48 form a fluid tight closure for the inner ends of the insulating tubes 37 and 38 while the outer ends of the tubes are sealed in a fluid tight relation within the rings 42 and 43, respectively. Cooling fluid is adapted to be supplied to the tube anode from the source of supply through the connector 65 and insulating tube 66 while fluid is discharged from the anode structure through the outlet 67 into the interior of the housing. The cooling fluid is returned through the drain connection 68 extending through the base member to the source of supply 30.

Secured to the opposite sides of the base 32 of the tube housing are a pair of ears 70 which extend upwardly at right angles with respect to the base 32 along the opposite sides of the shell 33. The ears 70 are provided with openings 69 through which fastening bolts may be arranged for securing the tube housing to the supporting yoke 16 on the carriage structure.

The housing cover, or shell, 33 may be of any suitable shape depending upon the size and shape of the X-ray tube employed with sufficient clearance between it and the tube so as adequately to withstand the operating voltages but at the same time compact enough so that the cooling fluid capacity thereof will not be excessively high. As illustrated in the drawings the upper portion of the shell is preferably of semicircular cross section so as to be substantially uniformly spaced from the periphery of the tube.

The shell 33 is provided with a window 71 which may be formed of any suitable material readily permeable to X radiations, such as a thin strip of aluminum. The aluminum strip may be seated against a shoulder 72 provided about the window opening of the shell and welded on the inside of the shell to a fin 73 extending inwardly at right angles to the shoulder 72. Except for the window 71 the enclosing housing for the X-ray tube 36 is substantially impermeable to X radiations. As shown, the housing may be provided with a lead lining 74 of a suitable thickness upon the inner surface thereof.

The window 71 provided in the housing shell 33 extends about the X-ray tube 36 throughout an angle of substantially 180 degrees, that is, the opposite ends of the window 71 extend substantially to diametrically opposite points relative to the enclosed tube 36. With the tube properly positioned within the housing X radiations emanating from the target of the tube are permitted to pass through the window in a relatively narrow, fan shaped field with an angle of divergence corresponding substantially to 180 degrees.

With an X-ray tube of conventional design a field pattern of radiations of uniform intensity cannot usually be obtained throughout a full 180 degre angle in a plane at right angles to the axis of the tube for reasons which may be more clearly understood with reference to the diagrammatic views of Figs. 5 and 6. In Fig. 5 is illustrated an X-ray tube of common design comprising a glass envelope 80, a cathode 81 arranged within a focusing cup 82, and an anode 83 having a plane face 84 within which the target is embedded, the plane of the face being inclined at an angle with respect to the longitudinal axis of the tube somewhat less than 90 degrees as indicated by the angle $a$. Upon bombardment of the target by a stream of electrons from the filament 81, X radiations are given off from the surface thereof throughout a hemispherical field of distribution bounded by the plane 85 of the anode face. Actually, however, relatively few rays are given off from the anode target in a direction parallel with the plane of the target so that a zone of weak field intensity exists next adjacent to the plane 85 of the target face. Beyond a small angle, such as five or six degrees as indicated at $b$, from the plane 85 the field intensity of the X radiations is substantially uniform in all directions. Considering the field of radiations in a plane at right angles to the longitudinal axis of the tube and through the center of the target in the anode face, it follows that X rays will travel in the direction of the plane only above the horizontal center line as viewed in Fig. 5. The field intensity in the right angle plane will be substantially uniform at equidistant points throughout the angle $c$ indicated in Fig. 6 while the field intensity will be of progressively diminishing strength at the opposite ends of the semi-circle throughout a distance indicated by the angles $d$. If the tube be arranged within the housing so that the face of the anode slopes upwardly and is positioned under the window in the housing shell, then a fan shaped field pattern of X rays will be permitted to pass therethrough throughout the maximum angle of X radiation in the right angle plane of the window.

With the tube 36 arranged in the housing 15 in the manner described and the housing supported within a cylinder so that the longitudinal axis of the tube coincides substantially with the longitudinal axis of the cylinder in the manner shown in Fig. 7, the carriage is so adjusted longitudinally of the cylinder so that the plane of the window substantially coincides with the plane of the weld. The weld will thus be centered in the fan shaped field of radiations passed through the housing window 71 and also be substantially uniformly spaced from the X-ray tube. A long strip of film in a suitable holder may be wrapped around the cylinder 86, as indicated at 87, extending through an angle corresponding to the angle of the radiation pattern from the tube, and a similar length of the annular weld may be radiographed with a single exposure. It is desirable to provide a certain amount of overlap in exposing the successive lengths of film and thus while it is possible to radiograph approximately 180 degrees of the weld at one time, as a practical matter it is preferred to radiograph somewhat less than this angle and to make three exposures to completely cover one annular weld, each providing a certain amount of overlap of the exposure on the opposite ends of the film so as to insure complete coverage.

It will be observed that the X-ray tube 36 is firmly mounted upon the flat base portion 32 of the housing structure and that the unit is supported by the yoke 16 through the ears 70 extending upwardly from the opposite edge portions of the base member. The cover shell 33 may be readily removed for inspection or replacement of the tube 36 without requiring complete dismantling of the apparatus. Upon the removal of the cover all of the enclosed parts are fully exposed, such as for the inspection of the various conductive connections, tube clamps and any adjustments required thereby can readily be made. It is not necessary even to disconnect the high voltage cables extending to the transformer or the cooling fluid lines.

In radiographing an annular weld by three separate exposures it will be necessary to rotate the housing 15 supported upon the end of shaft 18 through a combined angle of considerably less than 360 degrees so that the cable loops and the loops in the hose connections depending from below the tube housing present no problem insofar as interference with the adjustment of the housing to the desired angle is concerned. The housing is retained in the desired angular position of adjustment by means of any suitable locking device, such as the toothed wheel 25 and the dog 24 arrangement shown.

In the modification of the invention just described the maximum operating angle for X radiography is limited to 180 degrees or slightly less. This limitation of the arrangement requires that the tube housing be rotatably supported upon the carriage structure and adjusting means provided for enabling an operating range of a full 360 degrees. In the modifications shown in Figs. 8 and 9 enclosure housings are provided with which it is possible to radiograph a complete annular weld of 360 degrees with a single exposure from a stationarily mounted tube.

Referring again to the diagrammatic sketch of Fig. 5, it will be recalled that the ray emitting window 71 of the previously described housing extended in a plane at right angles to the longitudinal axis of the tube. Due to the intersection of this plane with the angularly disposed plane 85 of the anode face, radiations are given off in this plane only through a maximum angle of 180 degrees. It will be observed, however, that radiations are given off from the anode target throughout a full 360 degree range in the plane of the anode face. While the field intensity in such a plane closely adjacent the plane of the face may be relatively weak at a distance from the tube, as explained above, the field intensity will be of normal strength at equidistant points in a plane, such as indicated by dotted lines 88, spaced outwardly away from the plane of the anode face. If, then, the tube be mounted within a housing provided with an annular window and at such an angle with respect thereto that the plane of the window extends parallel with the plane of the anode face, a generally disc like field pattern of radiations may be produced.

In the embodiment illustrated in Fig. 8 a housing 90 is fixedly supported upon the frame structure 91 in an overhanging relation with respect to the end of the carriage 92. The housing comprises a base fixture 93 secured as by bracket 94 to the frame structure 91. The tube 95 of a conventional type similar to that previously described is supported by means of an insulating bracket 96 to the inner surface of the base 93. The tube is so positioned within the housing that the sloping face of the anode lies in a substantially vertical plane. Arranged about the tube 95 is a recessed cylindrical shell 98 removably secured at its open end to the edge of the base member 93. An annular window 99 is provided in the cylindrical wall of the shell 98 so as to provide for substantially free passage of X radiations therethrough, the remainder of the housing being substantially impermeable to X rays. It will be observed that the rear or right hand edge of the window 99 is substantially flush with the plane of the anode face while the greater portion of its width extends toward the left thereof. As previously explained, a field of only weak intensity is radiated from the tube next adjacent the plane of the anode face while at a slight angle outwardly therefrom the field strength becomes substantially uniform at equidistant points. Accordingly, the X-ray tube and housing arrangement of this modification is positioned within the cylinder in a somewhat offset relation with respect to the annular weld to be photographed. The dotted line 101, Fig. 8, represents the plane of the anode face of X-ray tube 95 while line 102 represents the plane of the annular weld 103 in the cylinder 104. The spacing between the planes 101 and 102 is such that the annular weld 103 will be subjected to X radiations of full normal intensity and uniform distribution. Care must be taken, however, that the space be not increased to such an extent that the focusing cup 105 surrounding the tube cathode projects into the line between the weld 103 and the tube target to shield off the radiations at such point. The permissible range of adjustment will depend, of course, upon the specific design of the tube at hand.

The cathode connections 107 are preferably of a conductive metal, such as aluminum strips, which will not substantially interfere with the radiations passing outwardly through the window 99. The enclosure housing may be made fluid tight and cooling fluid supplied to the tube in much the same manner as previously described.

While the apparatus, and more particularly the housings, have been described with particular reference to adaptations for mounting X-ray tubes, it will readily be understood that any other source of penetrative radiations may be mounted therein, such as a capsule of radium salt or of a gamma ray emitting gas such as Radon.

Having described the invention in what is considered preferred embodiments thereof, it is desired that it be understood that the invention may be carried out in other ways.

I claim:

1. Industrial radiographic apparatus for making penetrative ray examinations of annular metal sections, said apparatus comprising an enclosure housing for an X-ray tube, said housing having a relatively narrow and long window extending around the enclosed tube whereby X rays are permitted to pass therethrough throughout a relatively wide angle of divergence and in a field of narrow depth for simultaneously penetrating a relatively wide angle portion of said annular metal section.

2. Industrial radiographic apparatus for making penetrative ray examinations of annular metal sections, said apparatus comprising an enclosure housing for a source of penetrative rays, said housing comprising walls relatively impermeable to rays from said source, said housing including a relatively narrow and long wall portion readily permeable to rays from said source, said wall portion extending around said source whereby a field of rays is allowed to pass through said housing throughout a relatively wide angle and in a field of relatively narrow depth for simultaneously penetrating a relatively wide angle portion of said annular metal section.

3. Industrial radiographic apparatus for making penetrative ray examinations of annular metal sections, said apparatus comprising an enclosure housing for a source of penetrative radiations having a relatively long and narrow window provided in one wall thereof, said window extending in the circumferential direction relative to said tube whereby radiations from said source through said housing are substantially restricted to a field of narrow depth and extending radially from said tube throughout a relatively wide angle for simultaneously penetrating a relatively wide angle portion of said annular metal section.

4. Industrial radiographic apparatus for making penetrative ray examinations of annular metal sections, said apparatus comprising an enclosure housing for an X-ray tube, said housing having an elongate window provided in one wall thereof, said window extending in such a direction relative to the position of said tube that X radiations emanating from said tube and passing through said window are limited to a relatively small angle of divergence in the direction longitudinally of the tube and to a relatively large angle of divergence in the direction radially of said tube for simultaneously penetrating a relatively wide angle portion of said annular metal section.

5. Industrial radiographic apparatus for making penetrative ray examinations of annular metal sections, said apparatus comprising an enclosure housing for an X-ray tube having a relatively narrow and long window extending around the enclosed tube to substantially diametrically opposite points relative to said tube for passing a wide angle field of X radiations for simultaneously penetrating a relatively wide angle portion of said annular metal section.

6. Industrial radiographic apparatus for making penetrative ray examinations of annular metal sections, said apparatus comprising an enclosure housing for an X-ray tube, said housing comprising walls relatively impermeable to X rays, a relatively long and narrow window formed in one of said walls and being readily permeable to X rays, means for supporting a tube within said housing with the target thereof positioned beneath said window that a relatively wide angle field of radiations is permitted to pass therethrough for simultaneously penetrating a relatively wide angle portion of said annular metal section.

7. Industrial radiographic apparatus for making penetrative ray examinations of annular metal sections, said apparatus comprising an enclosure housing for an X-ray tube, said housing comprising walls substantially impermeable to X rays, an annularly extending window in said housing, means for supporting an X-ray tube within said housing in such a relation to said window that X rays are permitted to pass therethrough throughout an angle substantially equal to 360 degrees for simultaneously penetrating a relatively wide angle portion of said annular metal section.

8. Industrial radiographic apparatus for making penetrative ray examinations of annular metal sections, said apparatus comprising an enclosure housing for an X-ray tube, said housing comprising walls relatively impermeable to X radiations, means for supporting an X-ray tube within said housing, a relatively narrow window in one of said walls readily permeable to X rays, said window extending about said tube in a plane substantially parallel to the plane of the face of the tube anode whereby radiations from said tube may simultaneously penetrate a relatively wide angle portion of said annular metal section.

9. Industrial radiographic apparatus for making penetrative ray examinations of annular metal sections, said apparatus comprising an enclosure housing for an X-ray tube, said housing comprising walls substantially impermeable to X rays, one of said walls having a portion semi-circular in cross section, means for supporting an X-ray tube within said housing with the longitudinal axis thereof substantially coinciding with the axis of said curved wall portion, a relatively narrow elongate window provided in said curved wall portion, said window extending radially of said tube whereby radiations from said tube may simultaneously penetrate a relatively wide angle portion of said annular metal section.

10. An X-ray apparatus comprising an X-ray tube having a spaced apart target and filament, an enclosure housing for said tube comprising a base member, insulating means mounting said tube on said base member, a cover shell extending over said tube and secured to said base member, the target of said tube facing away from said base member, a wall portion of said shell above said tube target being readily permeable to X rays, the remainder of said housing being substantially impermeable to X rays, said wall portion extending lengthwise radially about said tube throughout an angle of substantially 180 degrees.

11. An X-ray apparatus comprising an X-ray tube having a spaced apart target and filament, an enclosing housing for said tube comprising a base fixture, means mounting said tube in a spaced relation above said fixture, a cover shell arranged over said tube and sealed thereabout to said base fixture, the upper portion of said shell being semi-circular in cross section and uniformly spaced from said tube, a relatively narrow strip of the upper portion of said shell extending crosswise thereof and being readily permeable to X rays emanating from said tube, the remainder of said housing being substantially impermeable to X rays.

12. Industrial radiographic apparatus for X raying annular welds in hollow metal bodies, said apparatus comprising a support, an X-ray tube, a housing for said tube having an elongated window therein, means mounting said housing upon said support so as to be positioned thereby substantially at the center of said anular weld and with said window extending in a plane substantially parallel with the plane of said weld.

13. Industrial X-ray apparatus primarily adapted for X raying annular welds in hollow metal bodies, said apparatus comprising a movable support, an X-ray tube, a housing for said tube having a relatively wide angle window therein, means mounting said housing in an overhanging relation upon said support and held thereby substantially along the axis of said annular weld said wide angle window extending lengthwise in a plane substantially parallel with and relatively closely adjacent the plane of said weld, said support being displaced to one side of said planes.

14. Industrial X-ray apparatus for X raying annular welds in hollow metal bodies, said apparatus comprising a support, an X-ray tube, a housing for said tube having an elongated window therein extending substantially in the plane of the tube target face, means mounting said housing upon said support in an overhanging relation with respect thereto and substantially on the axis of said annular weld, said tube being so arranged that the plane of the target thereof is substantially parallel with the plane of the annular weld.

15. Industrial X-ray apparatus for radiographing annular welds in a metal cylinder, said apparatus comprising a support adapted to be arranged within said cylinder, an X-ray tube, a housing for said tube having an elongated window therein, means mounting said tube housing upon said support with the longitudinal axis of said tube extending substantially along the longitudinal axis of said cylinder, said mounting means being adjustable to permit rotative movement of said tube about its axis.

16. Industrial X-ray apparatus comprising an elongated X-ray tube housing including a base fixture, hollow conical extensions projecting from the lower side of said base fixture, insulating tubes secured to the outermost ends of said conical extensions and extending upwardly through said extensions, an X-ray tube mounted on the ends of said tubes above said base fixture, a recessed shell arranged over said tube and removably secured around the edge thereof to said base fixture, an elongate window in the upper surface of said shell extending at right angles with respect to the axis of said tube, and means secured to said base fixture for supporting said housing.

17. Industrial X-ray apparatus comprising an X-ray tube housing including a base fixture, a pair of spaced tubular extensions projecting downwardly from said base fixture, an insulating tube secured in the outer end of each of said extensions, said tubes extending upwardly through said tubular extensions in a spaced relation with respect thereto to a point above the upper surface of said base fixture, insulating means closing the upper ends of said insulating tubes, terminal means extending through said last mentioned insulating means, an X-ray tube secured at its opposite ends to the upper ends of said insulating tubes and supported thereby above said base fixture, the electrodes of said tube connected to said terminal means, a recessed shell arranged over said tube in a spaced relation with respect thereto and removably secured around its edge to said base fixture, an elongated window in said shell and extending thereacross to substantially diametrically opposite points with respect to said tube and means secured to said base fixture for supporting said housing.

18. Industrial X-ray apparatus comprising an X-ray tube housing including a base fixture, a pair of spaced tubular extensions projecting downwardly from said base fixture, an insulating tube secured in the outermost end of each of said extensions, said tubes extending upwardly through said extensions in a spaced relation with respect thereto to a point above the upper surface of said base fixture, terminal means closing the upper ends of said tubes, an X-ray tube mounted at its opposite ends upon the upper ends of said insulating tubes, a recessed shell arranged over said tube and removably secured around its edge to said base fixture, an upper wall portion of said shell being substantially uniformly spaced from said tube throughout substantially one-half of the circumference of said tube, an elongate window in said wall portion extending radially of said tube, supporting means for said housing secured to said base fixture, said supporting means extending from one end of said housing and being rotatable to permit rotative adjustments of said tube substantially about the axis thereof.

19. Industrial X-ray apparatus comprising an X-ray tube housing including a base fixture, an X-ray tube having a spaced apart target and filament, insulating means supporting said tube upon said base fixture, a recessed shell arranged around said tube and removably secured about the edge thereof to said base fixture, a ray emitting window in said shell extending around said tube in a plane substantially parallel with the face of said target, said window being so arranged in said shell with respect to said tube that radiations are permitted to pass therethrough throughout substantially 360 degrees.

CORMACK E. BOUCHER.